United States Patent
Snider (10) Patent No.: US 8,788,831 B2
(45) Date of Patent: Jul. 22, 2014

(54) MORE ELEGANT EXASTORE APPARATUS AND METHOD OF OPERATION

(75) Inventor: Lindsay Eugene Snider, Ann Arbor, MI (US)

(73) Assignee: Barracuda Networks, Inc., Campbell, CA (US)

(*) Notice: Subject to any disclaimer, the term of this patent is extended or adjusted under 35 U.S.C. 154(b) by 356 days.

(21) Appl. No.: 13/246,386

(22) Filed: Sep. 27, 2011

(65) Prior Publication Data

US 2012/0017096 A1 Jan. 19, 2012

Related U.S. Application Data

(63) Continuation-in-part of application No. 12/408,644, filed on Mar. 20, 2009, now Pat. No. 8,285,997.

(51) Int. Cl.
- *H04L 29/06* (2006.01)
- *G06F 21/62* (2013.01)
- *G06F 3/06* (2006.01)
- *G06F 11/14* (2006.01)
- *G06F 21/60* (2013.01)

(52) U.S. Cl.
CPC ............ *G06F 21/6218* (2013.01); *G06F 3/067* (2013.01); *G06F 11/1453* (2013.01); *G06F 11/1464* (2013.01); *G06F 21/60* (2013.01); *G06F 21/62* (2013.01)
USPC ........................................................ 713/176

(58) Field of Classification Search
CPC ..... G06F 21/60; G06F 21/62; G06F 21/6218; G06F 3/067; G06F 11/1453; G06F 11/1464
USPC .......................................................... 713/176
See application file for complete search history.

(56) References Cited

U.S. PATENT DOCUMENTS

| | | | | |
|---|---|---|---|---|
| 5,559,991 | A * | 9/1996 | Kanfi | 711/162 |
| 5,778,395 | A * | 7/1998 | Whiting et al. | 1/1 |
| 6,611,923 | B1 * | 8/2003 | Mutalik et al. | 714/4.1 |
| 6,625,625 | B1 * | 9/2003 | Kihara et al. | 1/1 |
| 6,865,655 | B1 * | 3/2005 | Andersen | 711/162 |
| 7,024,527 | B1 * | 4/2006 | Ohr | 711/161 |
| 7,552,356 | B1 * | 6/2009 | Waterhouse et al. | 714/6.1 |
| 7,685,459 | B1 * | 3/2010 | De Spiegeleer et al. | 714/6.12 |
| 7,734,643 | B1 * | 6/2010 | Waterhouse et al. | 707/770 |
| 7,779,296 | B2 * | 8/2010 | Urmston | 714/6.32 |
| 7,908,246 | B2 * | 3/2011 | Anglin et al. | 707/625 |
| 8,051,043 | B2 * | 11/2011 | Young | 707/646 |
| 2003/0063772 | A1 * | 4/2003 | Smith et al. | 382/100 |
| 2003/0065656 | A1 * | 4/2003 | de la Torre et al. | 707/3 |
| 2003/0236987 | A1 * | 12/2003 | Griffin et al. | 713/189 |
| 2004/0255140 | A1 * | 12/2004 | Margolus et al. | 713/193 |
| 2005/0240749 | A1 * | 10/2005 | Clemo et al. | 711/170 |
| 2010/0083003 | A1 * | 4/2010 | Spackman | 713/193 |

\* cited by examiner

*Primary Examiner* — Michael S McNally
(74) *Attorney, Agent, or Firm* — Duane Morris LLP (57) ABSTRACT

An apparatus to scale for multiple petabyte backup in redundant locations. Workload is automatically shared among many servers by a characteristic derived from the content itself. Duplicate storage is eliminated by checking for the existence or absence of simple files and appending client identification to files shared among multiple subscribers. Replication depends on simple atomic file operations rather than use of tables or databases. An efficient storage method for much larger quantities of data than conventional services.

12 Claims, 7 Drawing Sheets

MORE ELEGANT EXASTORE APPARATUS AND METHOD OF OPERATION

RELATED APPLICATIONS

This is a continuation in part of application Ser. No. 12/408,644 Backup Apparatus with Higher Security and Lower Network Bandwidth Consumption filed Mar. 20, 2009 which is incorporated by reference in its entirety.

BACKGROUND

As published in USPGazette 20100241619, it is known that digital signatures can be used to uniquely identify files. It is known that two files can be compared to identify their differences. It is known that content management systems endeavor to reduce disk consumption by reducing duplication within an enterprise. It is known that offsite backup of essential files are among best practices for data security. It is known that public/private key pairs are used for asymmetric encryption. When one key of a key pair is used to encrypt a message, the other key from that pair is required to decrypt the message. Conventional backup systems provide services for individuals or corporate customers. However bandwidth considerations are more limiting than raw disk capacity.

Furthermore, a known method comprises the following processes distributed across the Internet and local to customers of the apparatus and service. A data object is disassembled into shards. A recipe is determined for reassembling the shards. A fingerprint is computed for each shard and compared with stored fingerprints for stored shards. Shards are encrypted for transmission through a wide area network. A shard is not stored, encrypted, or transmitted if it can be determined from its fingerprint that the shard is duplicative of a previously stored shard.

Applicants have a rapidly and successfully grown a network of backup server appliances that have successfully scaled to petabyte capacity with wide acceptance. A non-linear expansion is required to meet demand for cloud based backup operations and for box to box backup operations. Conventional systems utilize database technology for tracking archives, ownership, and status of shards which is anticipated by the inventors to be a significant resource requirement in future scaling for higher performance and greater capacity.

Thus it can be appreciated that what is needed is far fewer instruction executions and operational steps to store multiple petabytes with redundancy.

BRIEF DESCRIPTION OF FIGURES

The appended claims set forth the features of the invention with particularity. The invention, together with its advantages, may be best understood from the following detailed description taken in conjunction with the accompanying drawings of which:

SUMMARY OF THE INVENTION

An apparatus is disclosed to scale for multiple petabyte backup in redundant locations. Workload is automatically shared among many servers by a characteristic derived from the content itself. Duplicate storage is eliminated by checking for the existence or absence of simple files and appending client identification to files shared among multiple subscribers. Replication depends on simple atomic file operations rather than use of tables or databases. An efficient storage method for much larger quantities of data than conventional services is disclosed for operating the apparatus.

Data from one client may be distributed among a plurality of servers in a group by inspecting a characteristic derived from the data itself which does not need to be stored in a database. Within each server, a plurality of flat files is created for each shard, wherein a shard is a quantum of a fragment of a client file. The names of the flat files are automatically generated to reflect substantially unique characteristics of the shards associated with the flat file. An atomic file operation subscribes or desubscribes a client from a shard. Replication of changed files in a plurality of locations is also handled by writing and deleting simple files.

It is known that an apparatus may provide both a client functionality and a server functionality. An apparatus may contain circuits to be a client and also circuits to be a server. A first backup client apparatus may also provide circuits as a server to a second backup client. Each apparatus may backup the other providing geographic diversity.

DETAILED DISCLOSURE OF EMBODIMENTS OF THE INVENTION

The present invention is coupled to one or more backup storage systems. The present invention is communicatively coupled through a wide area network to at least one of a plurality of backup clients. The invention is also embodied as an apparatus comprising

- a file management circuit to determine if a uniquely named flat file exists,
- when the uniquely named flat file exists, to append a client identifier to the end of the file,
- when the uniquely named flat file does not exist, to create and store a flat file comprising an encryption key and a client identifier and to request and store a shard with the substantially unique characteristic as the name of the flat file.

In an embodiment the apparatus also has a receiver circuit configured to receive from a backup client a substantially unique characteristic derived from a shard and a client identifier, to assign the shard to a server according to an excerpt from the substantially unique characteristic, to assign the shard to a group of servers according to the client identifier, and to request and receive a shard when the shard has been determined not to have been previously stored.

In an embodiment, the apparatus also has a file write and delete circuit configured to

- append an additional client identifier to an end of a stored uniquely named flat file,
- create and store a new uniquely named flat file containing an encryption key and a client identifier when the flat file does not already exist,
- create at least one token file to request replication of a shard or a uniquely named flat file, and
- delete the token file when the requested replication has succeeded.

Figure 1:
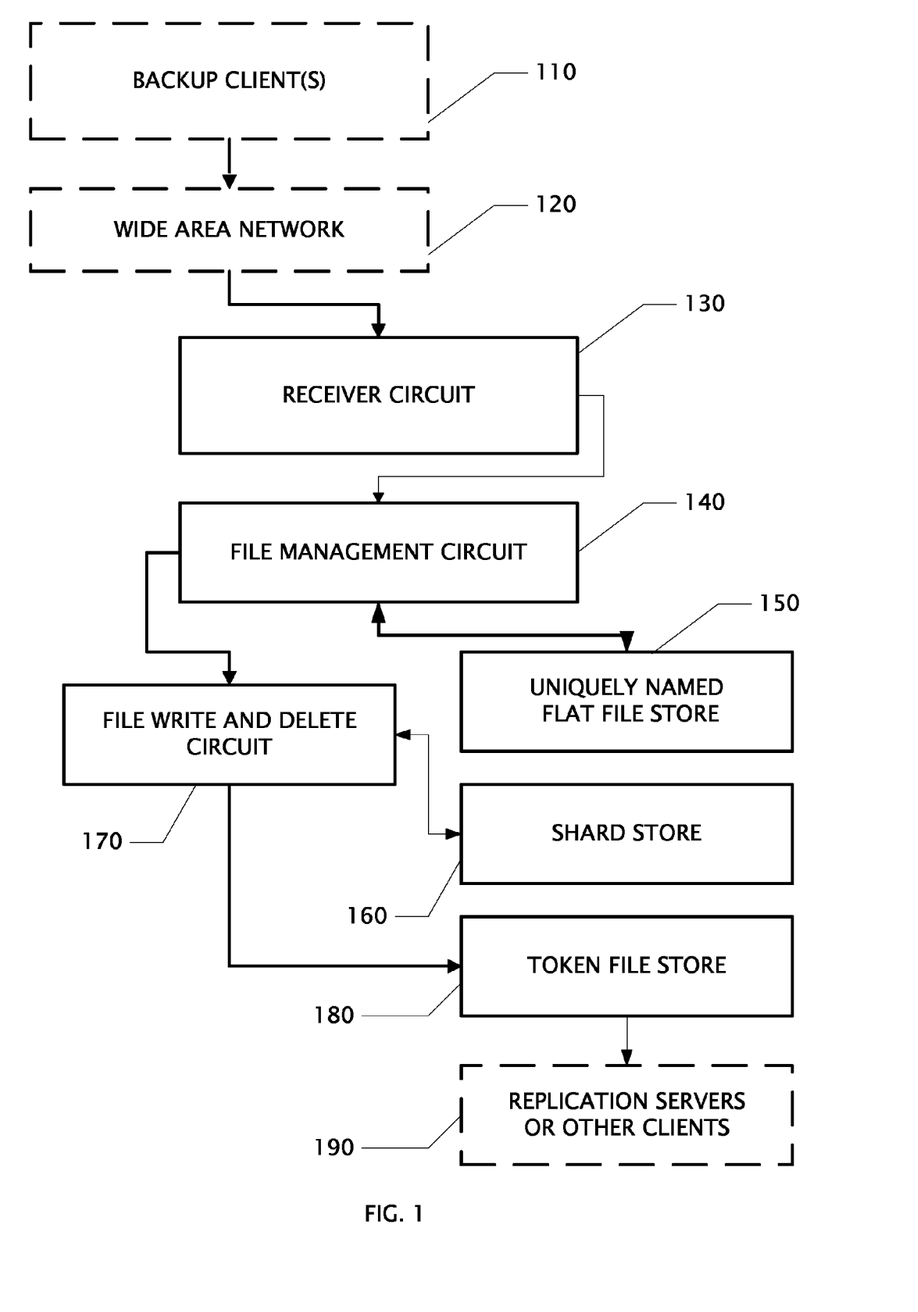
FIG. 1 is a schematic of a system block diagrams of components of an apparatus and data flows into and out of the apparatus.
Figure 2:
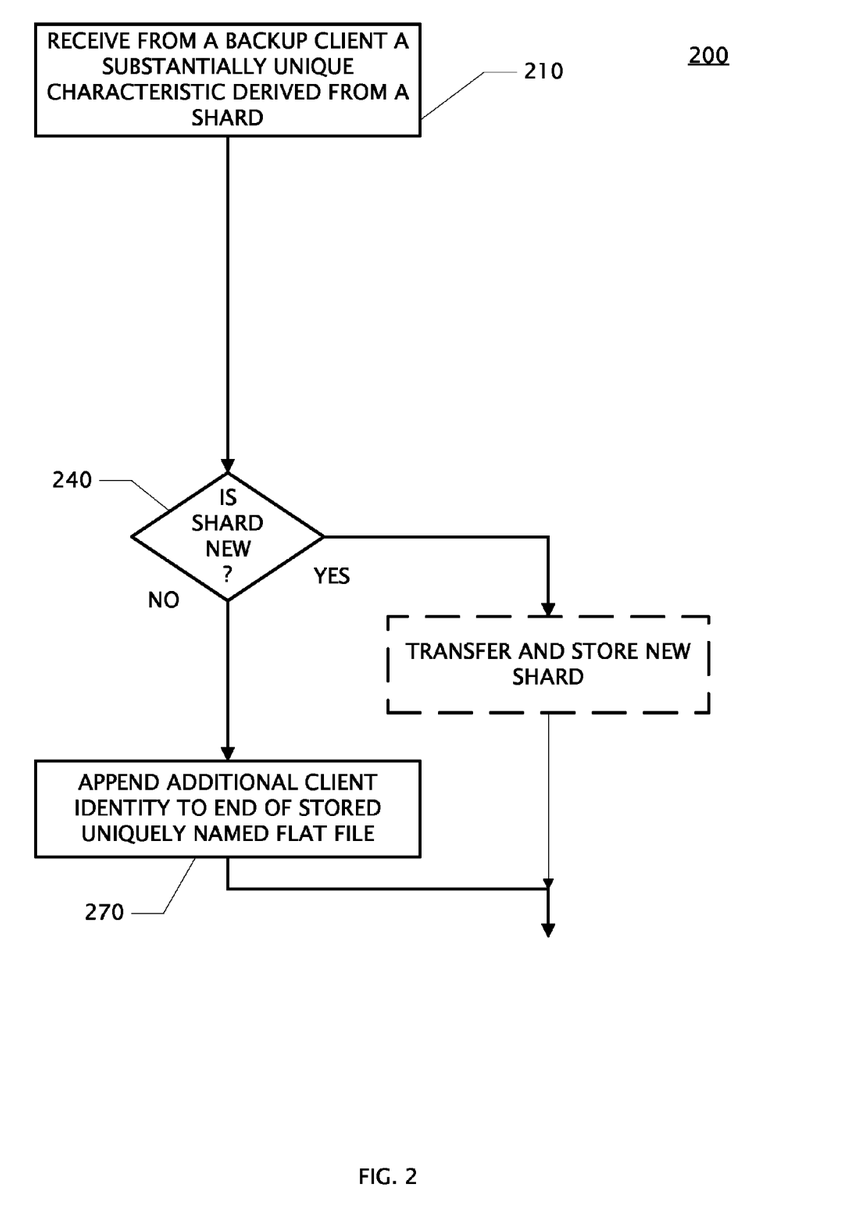
FIGS. 2-6 are flow chart diagrams of the method embodiment of the invention for operating a server comprising a processor.

Referring to the FIG. 2, one embodiment of the invention is a computer-implemented method 200 for control of an apparatus comprising a processor configured by instructions stored on a non-transitory computer readable medium, the method comprising:

receiving 210 from a backup client of a plurality of backup clients distinguishable by a client identifier, a substantially unique characteristic derived from a shard;

determining when the shard is a previously stored shard or a new shard to be stored 240, and when the shard is a previously stored shard, appending the client identifier of the backup client to an end of a previously stored uniquely named flat file 270.

In an embodiment, the substantially unique characteristic derived from a shard is a plurality of cryptographic hashes concatenated into a delimited string.

In an embodiment a shard is a portion of a data file. In an embodiment, a backup client divides deduplicated data files into shards and determines a substantially unique characteristic by computing a plurality of cryptographic hashes and concatenating them with delimiters and the number of bytes in each shard.

Figure 3:
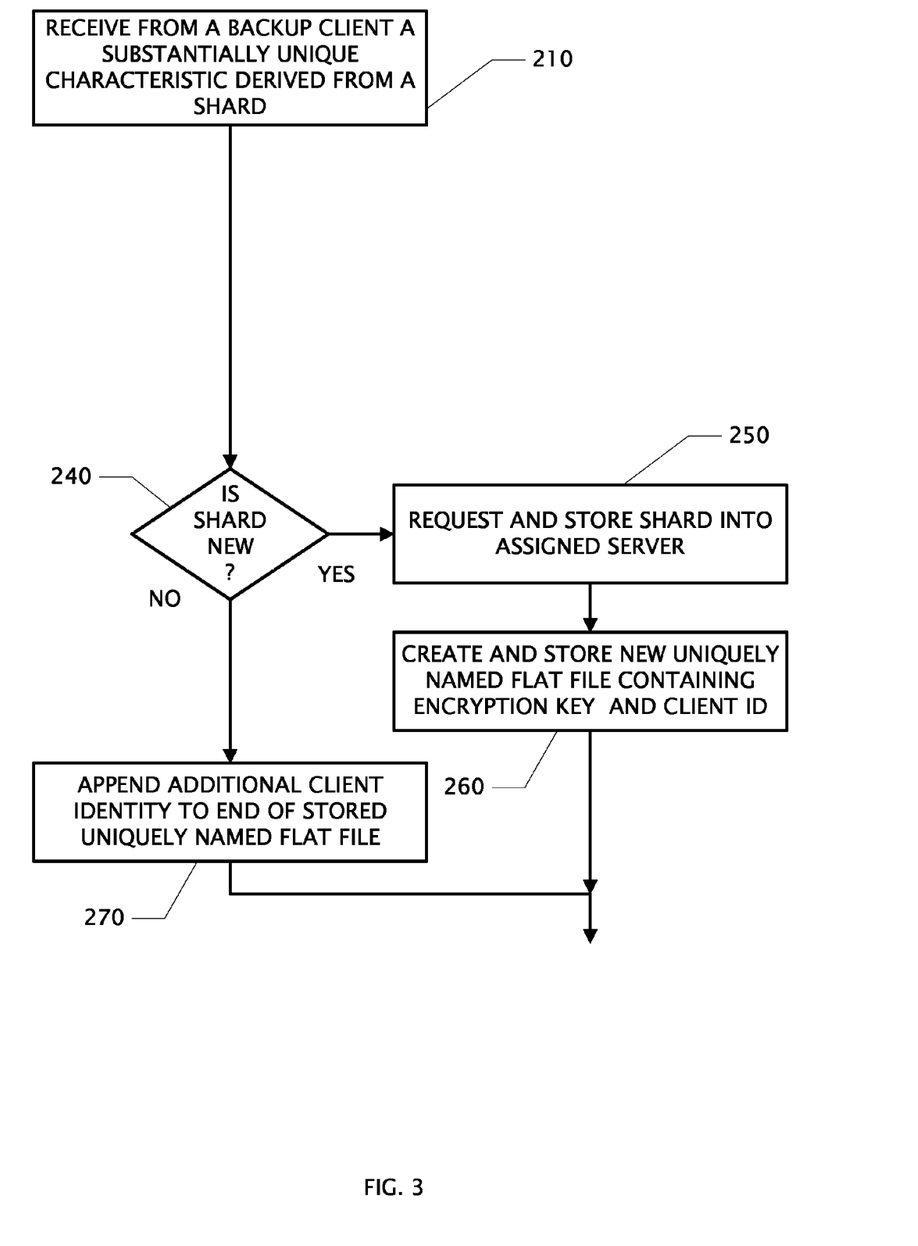

Referring now to FIG. 3, in an embodiment, the method further comprises: when the shard is a new shard to be stored, requesting and storing the shard into an assigned server 250, and creating and storing a new uniquely named flat file which contains an encryption key and the client identifier of the backup client 260 wherein the name of the new uniquely named flat file comprises the substantially unique characteristic derived from the shard.

In an embodiment, determining 240 when the shard is new refers to determining when a shard has been previously stored by determining when a flat file already exists which has a name comprising the substantially unique characteristic derived from the shard.

Figure 4:
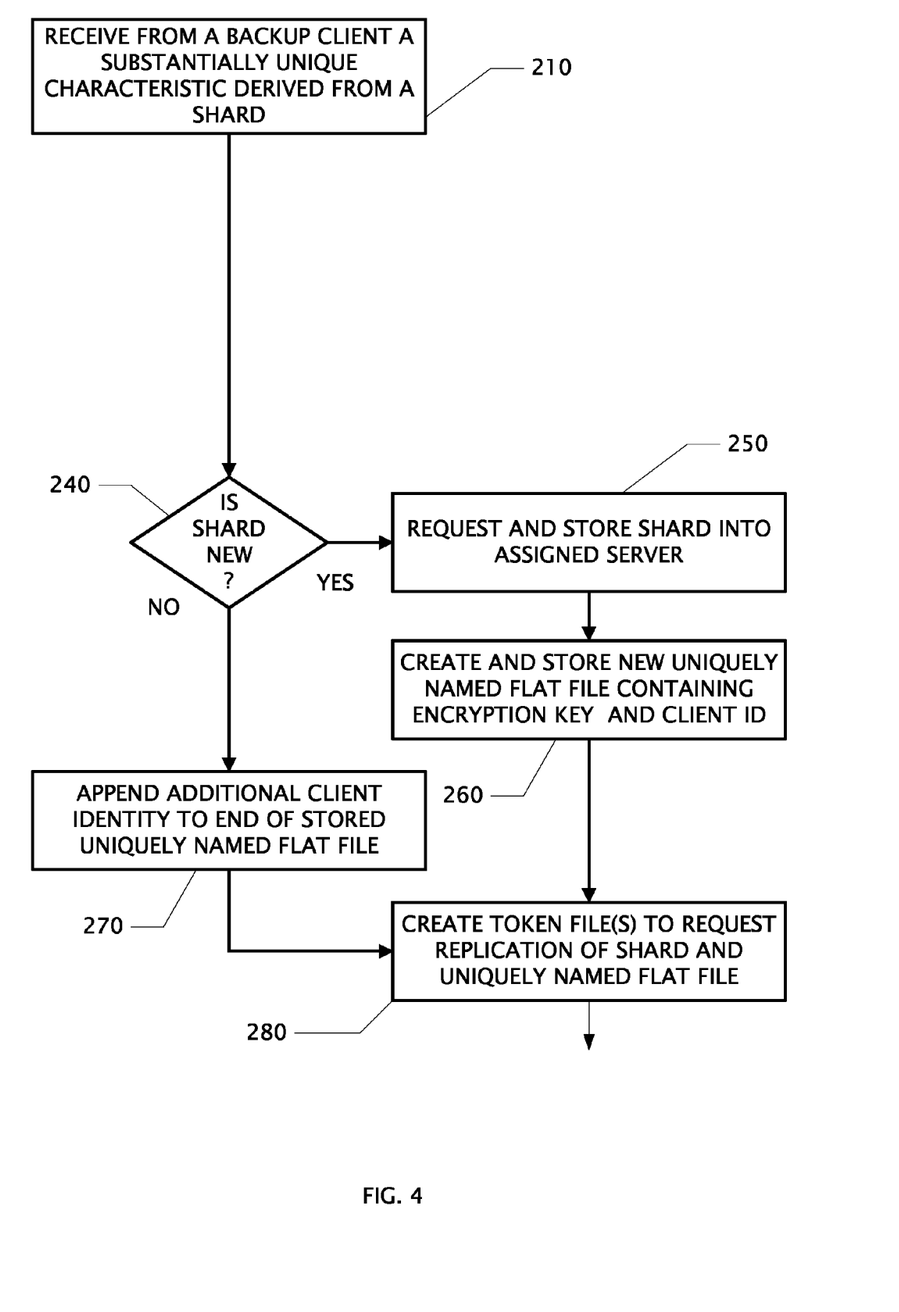

Referring now to FIG. 4, in an embodiment the method further comprises:

creating a token file to request replication of a shard and creating a token file to request replication of a uniquely named flat file wherein replication comprises storing to at least one non-transitory computer-readable medium on an other apparatus 280.

Figure 5:
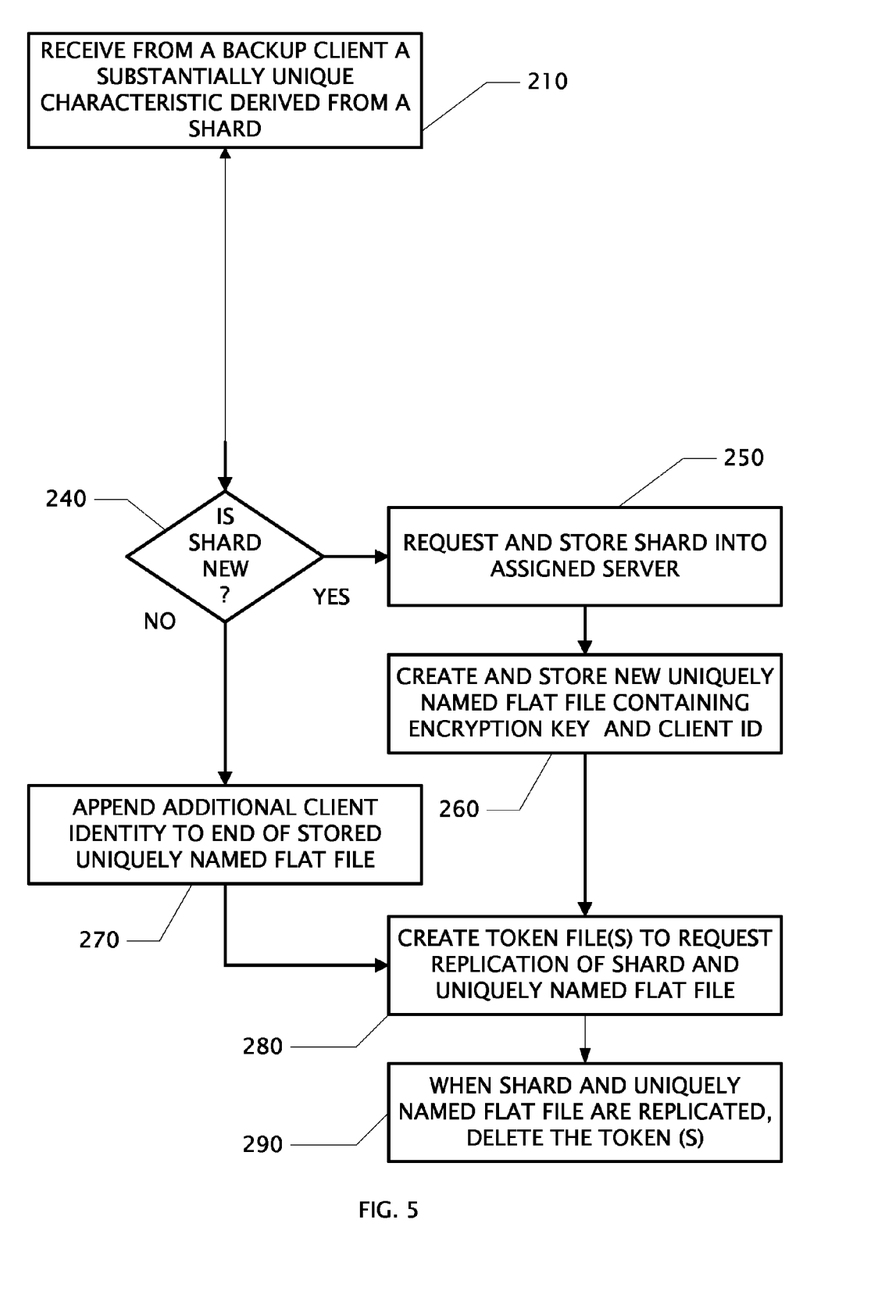

Referring now to FIG. 5 in an embodiment the method further comprises deleting the token file(s) when a shard of a uniquely named flat file have been successfully replicated 290.

Figure 6:
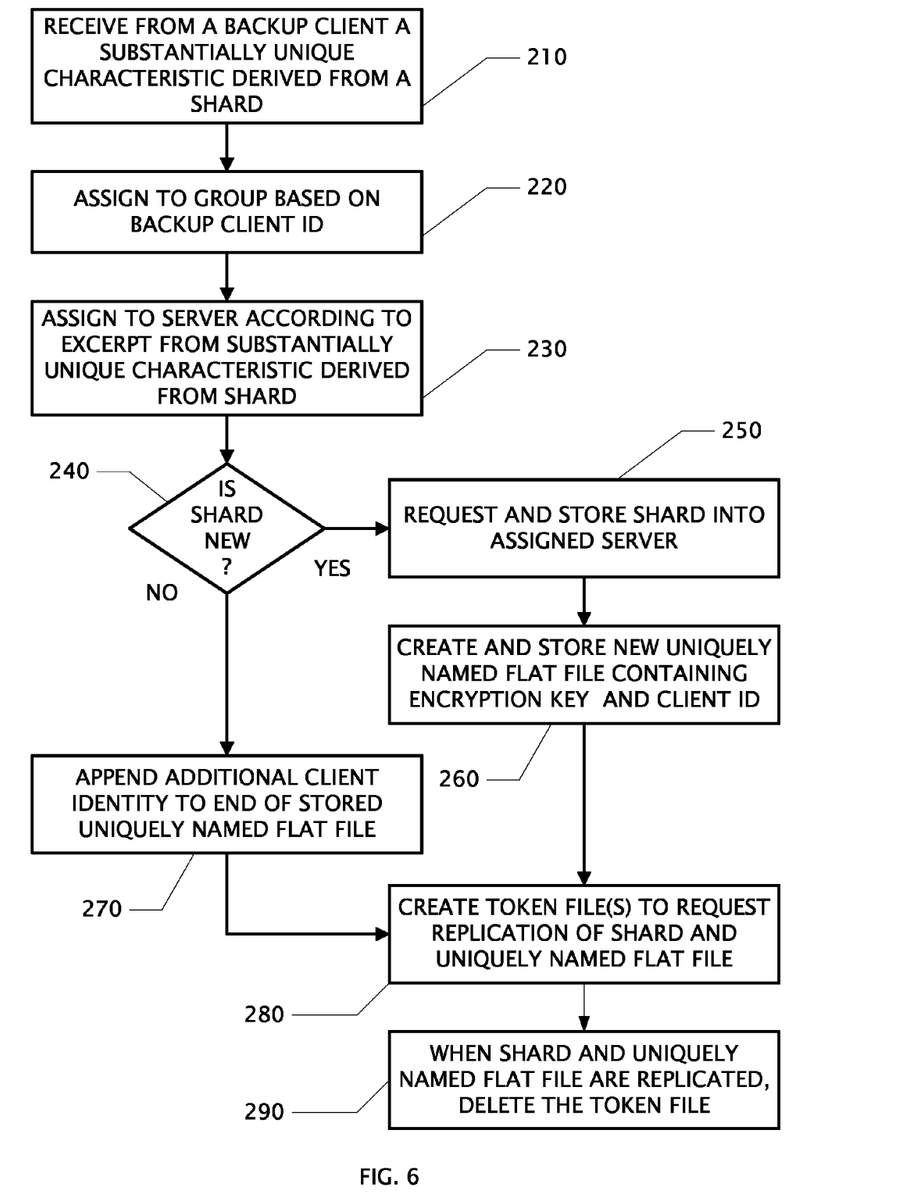

Referring now to FIG. 6, in an embodiment the method further comprises:

assigning the shard and the substantially named flat file to a server according to an excerpt from the substantially unique characteristic derived from the shard 230.

In an embodiment, the excerpt is a range of characters in the substantially unique characteristic.

In an embodiment the method further comprises: assigning the shard to a group of servers based on the client identifier of the backup client 220.

An other embodiment is a method comprising, receiving a shard and meta-data of a shard from a backup client, assigning to a server based on the first n bytes of a key, and appending to a file for the shard, the client id of the backup client.

In an other embodiment the meta-data comprises a key for the shard.

In an other embodiment the method has the additional steps:

creating a file containing the encryption key and the client id of the first client, storing the file, and storing the shard.

In an other embodiment the file containing the encryption key and the client ids of backup clients referencing the shard is named with the metadata of the shard.

In an other embodiment storing the file and storing the shard comprises: adding an action request file to the queue of the selected server and its replication server(s).

In an other embodiment the method further comprises assigning to a group of servers based on the backup client ID.

In an embodiment, a key comprises a hash computed on the shard.

In an embodiment a backup server is co-located within the apparatus of an other backup client.

Means, Embodiments, and Structures

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated.

Any of the operations described herein that form part of the invention are useful machine operations. The invention also related to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. Within this application, references to a computer readable medium mean any of well-known non-transitory tangible media.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

CONCLUSION

Figure 7:
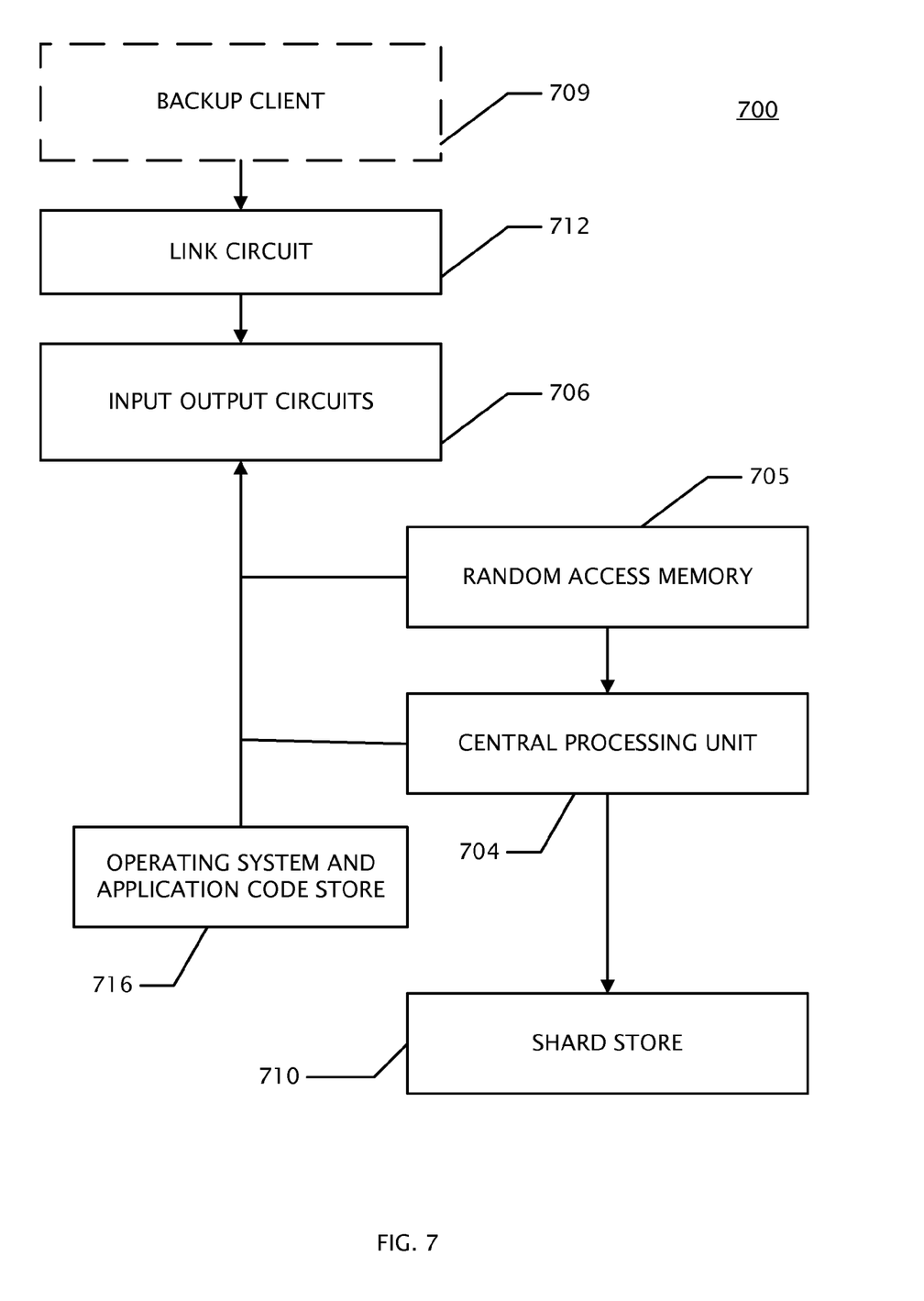
FIG. 7 is a block diagram of a processor executing the embodiments.

A non-limiting exemplary conventional processor is illustrated in FIG. 7. The processor comprises a hardware platform 700 comprising random access memory (ram) 705, central processing unit (cpu) 704, input/output circuits 706, a link circuit 712. In an embodiment, an operating system, and application code store 716. The processor is coupled to at least one client 709, and to non-transitory media to store shards 710.

The present invention is easily distinguished from conventional systems by its capacity and performance at petabyte and exabyte scale. Multi-step database operations are eliminated. Performance robbing reading of files is eliminated or minimized. Managing replication for data security is simplified by simple file generation and deletion.

The present invention is easily distinguished from conventional systems by fewer steps and simpler more efficient steps. Performance is improved by elimination of conventional file reads.

What is claimed is:

1. A computer-implemented method for control of an apparatus comprising a processor configured by instructions stored on a non-transitory computer readable medium, the method comprising:
    receiving from a backup client of a plurality of backup clients distinguishable by a client identifier, a substantially unique characteristic derived from a shard;
    determining when the shard is a previously stored shard or a new shard to be stored by determining if a flat file already exists which has a name comprising the substantially unique characteristic derived from the shard,
    when the shard is a previously stored shard,
    appending the client identifier of the backup client to an end of a previously stored uniquely named flat file,
    when the shard is a new shard to be stored,
    requesting and storing the shard into an assigned server, and
    creating and storing a new uniquely named flat file which contains an encryption key and the client identifier of the backup client, wherein the name of the new uniquely named flat file comprises the substantially unique characteristic derived from the shard,
    creating a token file to request replication of the shard and the uniquely named flat file to at least one non-transitory computer-readable medium on another apparatus.

2. The method of claim 1 wherein the substantially unique characteristic derived from the shard is a plurality of cryptographic hashes concatenated into a delimited string.

3. The method of claim 1 wherein the shard is a portion of a data file.

4. The method of claim 1 further comprising
    deleting the token file when a shard of a uniquely named flat file has been successfully replicated.

5. The method of claim 4 further comprising
    assigning the shard and the substantially named flat file to a server according to an excerpt from the substantially unique characteristic derived from the shard.

6. The method of claim 5 wherein the excerpt is a range of characters in the substantially unique characteristic.

7. The method of claim 6 further comprising
    assigning the shard to a group of servers based on the client identifier of the backup client.

8. A method comprising,
    receiving a shard and meta-data of a shard from a backup client, wherein the meta-data comprises a key for the shard;
    assigning the shard to a server based on the first n bytes of the key,
    creating a file containing an encryption key and a client id of the backup client, wherein the file containing the encryption key and the client id of the backup client referencing the shard is named with the metadata of the shard; and
    storing the file and the shard on the server.

9. The method of claim 8 wherein storing the file and storing the shard comprises
    adding an action request file to the queue of the selected server and its replication server(s).

10. The method of claim 9 further comprising
    assigning to a group of servers based on the backup client ID.

11. The method of claim 8 wherein the key is a hash computed on the shard.

12. An apparatus comprising
    a file management circuit to determine if a uniquely named flat file exists,
    when the uniquely named flat file exists, to append a client identifier to the end of the file,
    when the uniquely named flat file does not exist, to create and store a flat file comprising an encryption key and a client identifier and to request and store a shard with the substantially unique characteristic as the name of the flat file,
    a receiver circuit configured to receive from a backup client a substantially unique characteristic derived from a shard and a client identifier, to assign the shard to a server according to an excerpt from the substantially unique characteristic, to assign the shard to a group of servers according to the client identifier, and request and receive a shard when the shard has been determined not to have been previously stored,
    a file write and delete circuit configured to
    append an additional client identifier to an end of a stored uniquely named flat file,
    create and store a new uniquely named flat file containing an encryption key and a client identifier when the flat file does not already exist,
    create at least one token file to request replication of a shard or a uniquely named flat file, and
    delete the token file when the requested replication has succeeded.

* * * * *